United States Patent
Ye et al.

(10) Patent No.: US 7,819,678 B2
(45) Date of Patent: Oct. 26, 2010

(54) ELECTRICAL CARD CONNECTOR WITH IMPROVED SLIDE CARRIER

(75) Inventors: Ke-Hua Ye, Kunshan (CN); Qi-Jun Zhao, Kunshan (CN); Hua Yin, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/565,082

(22) Filed: Sep. 23, 2009

(65) Prior Publication Data

US 2010/0093200 A1  Apr. 15, 2010

(30) Foreign Application Priority Data

Oct. 15, 2008 (CN) .................... 2008 2 0302431

(51) Int. Cl.
*H01R 13/62* (2006.01)

(52) U.S. Cl. ...................................... 439/159; 439/630
(58) Field of Classification Search ................ 439/159, 439/630, 631, 946
See application file for complete search history.

(56) References Cited

U.S. PATENT DOCUMENTS

| | | | |
|---|---|---|---|
| 6,896,555 B1 * | 5/2005 | Su et al. ................ | 439/630 |
| 6,908,321 B1 * | 6/2005 | Lai ........................ | 439/140 |
| 7,011,549 B1 * | 3/2006 | Lai ........................ | 439/630 |
| 7,118,420 B1   | 10/2006 | Lai et al. | |
| 7,448,912 B1 * | 11/2008 | Shiue et al. ............ | 439/630 |
| 2006/0276082 A1 * | 12/2006 | Hung et al. ............ | 439/630 |
| 2007/0218770 A1 * | 9/2007 | Kikuchi et al. ........ | 439/630 |

FOREIGN PATENT DOCUMENTS

CN 201100929  8/2008

* cited by examiner

*Primary Examiner*—Neil Abrams
*Assistant Examiner*—Harshad C Patel
(74) *Attorney, Agent, or Firm*—Wei Te Chung; Andrew C. Cheng; Ming Chieh Chang

(57) ABSTRACT

An electrical card connector includes an insulative housing, a plurality of terminals retained in the insulative housing, a slide carrier slidable in the insulative housing, an eject mechanism mounted in the insulative housing for pushing the slide carrier, and a locking body attached to the slider for locking the slier carrier with the slider together while an electrical card is inserted into therein. The locking body defines an engaging portion protruding into the insertion slot. The engaging portion is deflectable to release locking engagement between the slider and the slide carrier while another electrical card being inserted into the insertion slot.

20 Claims, 9 Drawing Sheets

ELECTRICAL CARD CONNECTOR WITH IMPROVED SLIDE CARRIER

BACKGROUND OF THE INVENTION

1. Field of the Invention

The present invention relates to an electrical card connector, more particularly to an electrical card connector with improved slide carrier.

2. Description of Related Art

Most of the current electrical card connectors have an insertion slot and terminal groups for accommodating and electrical connection with a variety of electronic cards, such as memory stick (MS) cards, smart media (SM) cards, multimedia cards (MMC), secure digital (SD) card, and extreme digital (XD) cards. The electrical card connector usually defines a first terminal group corresponding to one card and a second terminal group corresponding to another card respectively. However, under such circumstance, if the user accidentally inserts one card into the electrical card connector only to electrical contact the first terminals group, a unnecessary physical contact may be established between the second terminal group and the first electrical card. Thus the second terminal group may be damaged by the first electrical card.

To overcome the above problem, the inventor used to invent an electrical card connector compatible with a slide carrier for protecting terminals. This electrical card connector includes an inslulative housing, a first terminal group corresponding to MS card, a second terminal group corresponding to SD card, a slide carrier slidable in the insulative housing for protecting the second terminal group, and an eject mechanism mounted in the insulative housing. The housing defines an insertion slot for receiving MS card and SD card. The first terminal group and the second terminal group have contact portions extending into the insertion slot respectively. The eject mechanism includes a slider to slide with the slide carrier in a card insertion direction, a coiled spring abutting against the slider, and a link rod for controlling positions of the slider. The slide carrier defines a plurality of grooves corresponding to the contact portions of the second terminal group, and a plurality of support portions each disposed into the grooves respectively. The contact portions of the second terminal group presses downwardly on the support portions respectively.

While the MS card is being inserted into the insertion slot, the MS card passes over the slide carrier to directly push the eject mechanism to slide inwardly. The MS card only touch the contact portions of the first terminal group, while not touch the contact portions of the second terminal group. While the SD card is being inserted into the insertion slot. The SD card pushes the slide carrier to slide inwardly with the slider together. The contact portions of the second terminal group are pulled upwardly out of the grooves to mate with the SD card. However, the slide carrier would drive the SD to slide toward an opening of the insertion slot if an electrical equipment which installing the electrical card connector is hit or shocked by exterior objects. As a result, signal transmission between the SD card and the second terminal group is terribly affected.

Hence, an improved electrical card connector with improved card restriction structure is needed to solve the problem above.

BRIEF SUMMARY OF THE INVENTION

According to one aspect of the present invention, an electrical card connector comprises an insulative housing defining a front mating face, and an insertion slot extending rearwardly from the mating face for receiving a first card and a second card shorter than the first card; a plurality of terminals retained in the insulative housing, the terminals each having a contact portion extending into the insertion slot, and a tail portion extending out of the insulative housing for being mounted on a print circuit board; a slide carrier slidable in the insulative housing, the slide carrier defining a push portion to eject the second card; an eject mechanism mounted in the insulative housing for pushing the slide carrier toward the mating face, and defining a protrusion on a rear end thereof to eject the first card; and a locking body attached to the slider to lock the slide carrier with the slider together; wherein the locking body defines an engaging portion protruding into the insertion slot, the engaging portion is deflectable to release locking engagement between the slider and the slide carrier while the first card being inserted into the insertion slot.

According to another aspect of the present invention, an electrical card connector, comprises an insulative housing defining a front mating face, and an insertion slot extending rearwardly from the mating face for receiving a first card and a second card shorter than the first card; a plurality of terminals retained in the insulative housing, the terminals each having a contact portion extending into the insertion slot for contacting the first card or the second card, and a tail portion extending out of the insulative housing for being mounted on a print circuit board; a push-push eject mechanism mounted in the insulative housing, and including a slider slidable in a card insertion direction, a coiled spring abutting against the slider, and a link rod to control positions of the slider with respect to the insulative housing, the slider includes a front slider and a rear slider which abutting against each other in a card insertion direction, the rear slider defining a protrusion into the insertion slot to eject the first card, the front slider defining a push portion located at front and outside of the protrusion; and a locking body unlocking the front slider with the rear slider together while the first card is inserted into the insertion slot; wherein the locking body locks the front slider with the rear slider together while the second card is inserted into the insertion slot.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
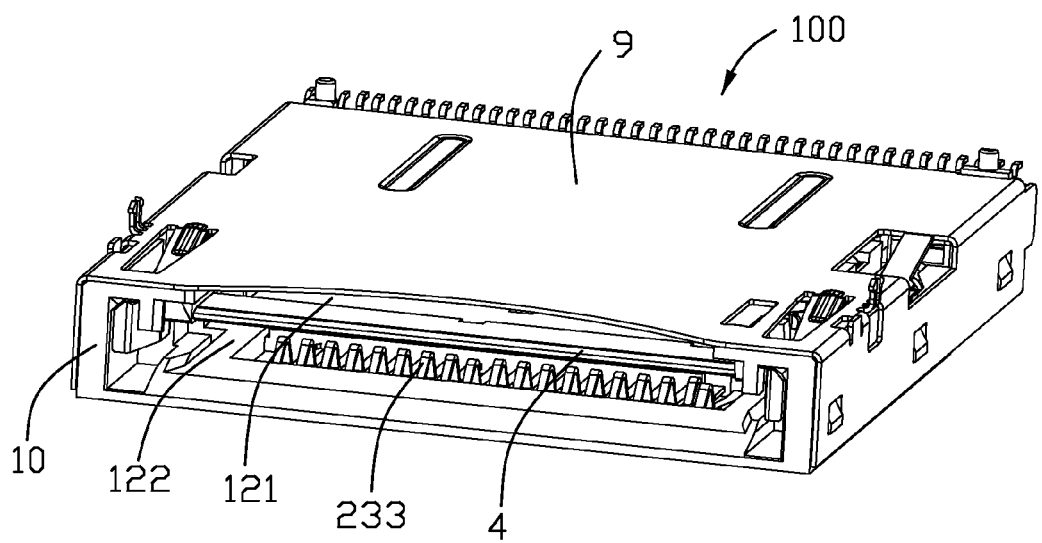
FIG. 1 is a perspective view of an electrical card connector according to the present invention.
Figure 2:
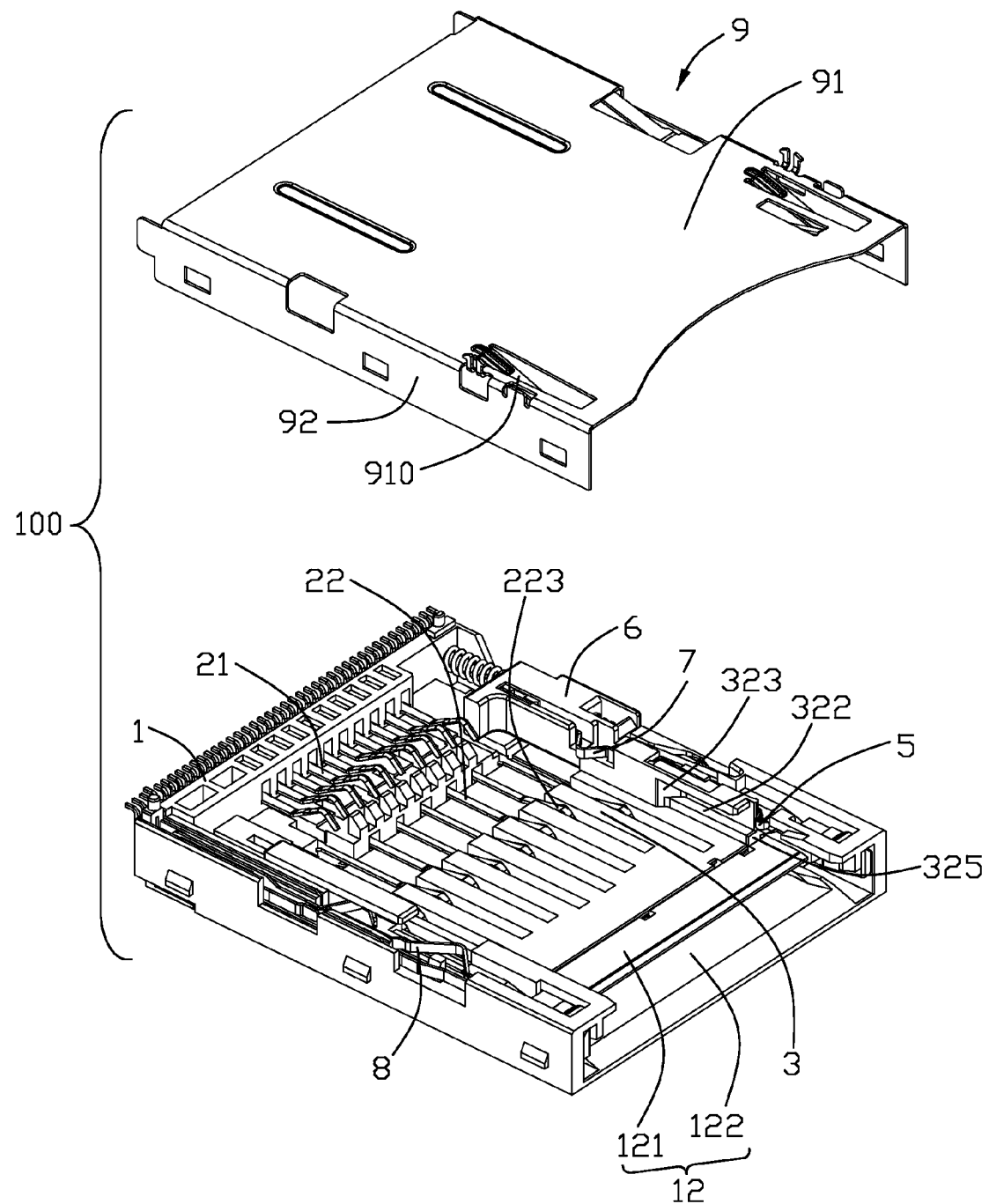
FIG. 2 is an inner view of the electrical card connector.
Figure 3:
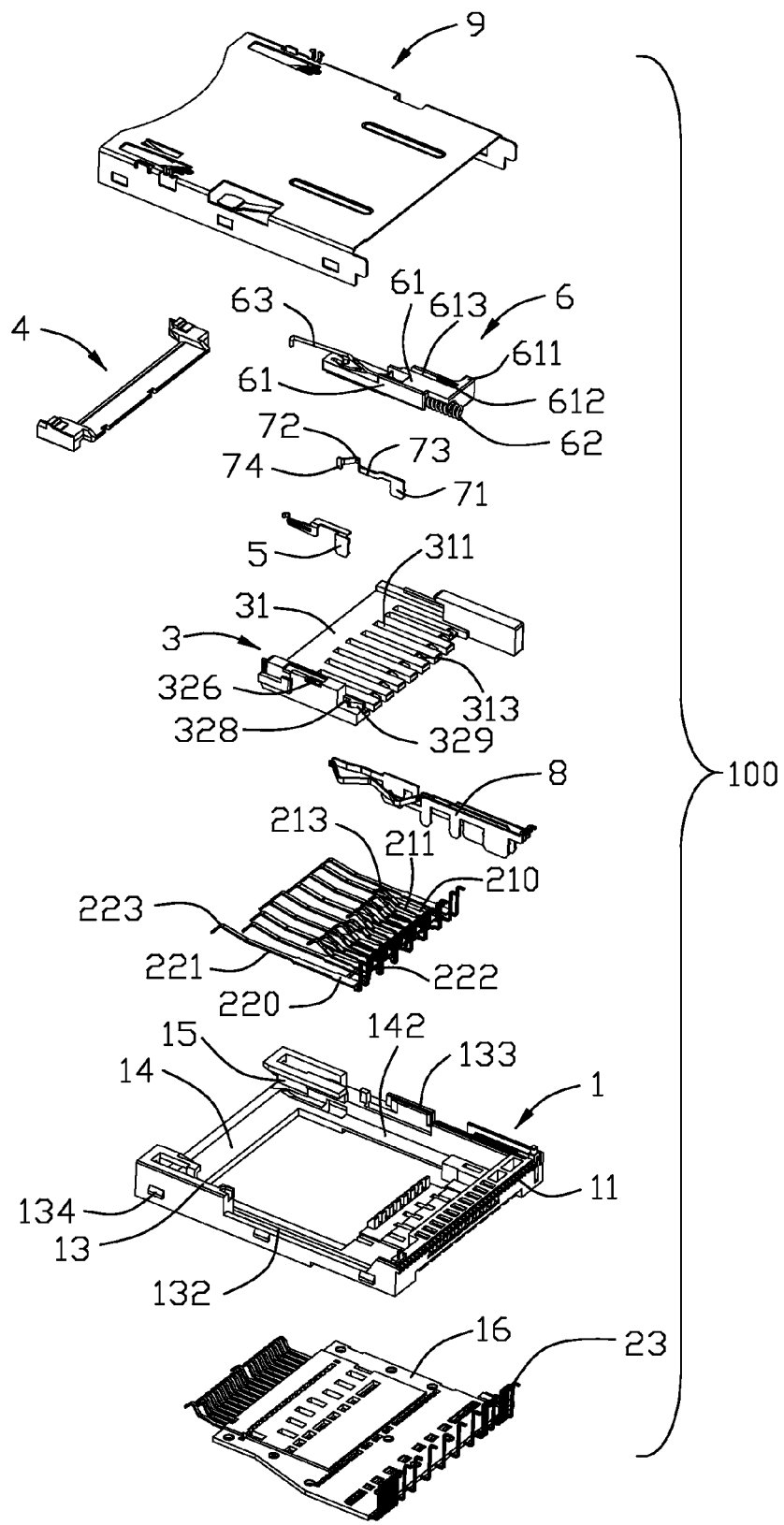
FIG. 3 is an exploded view of the electrical card connector.
Figure 4:
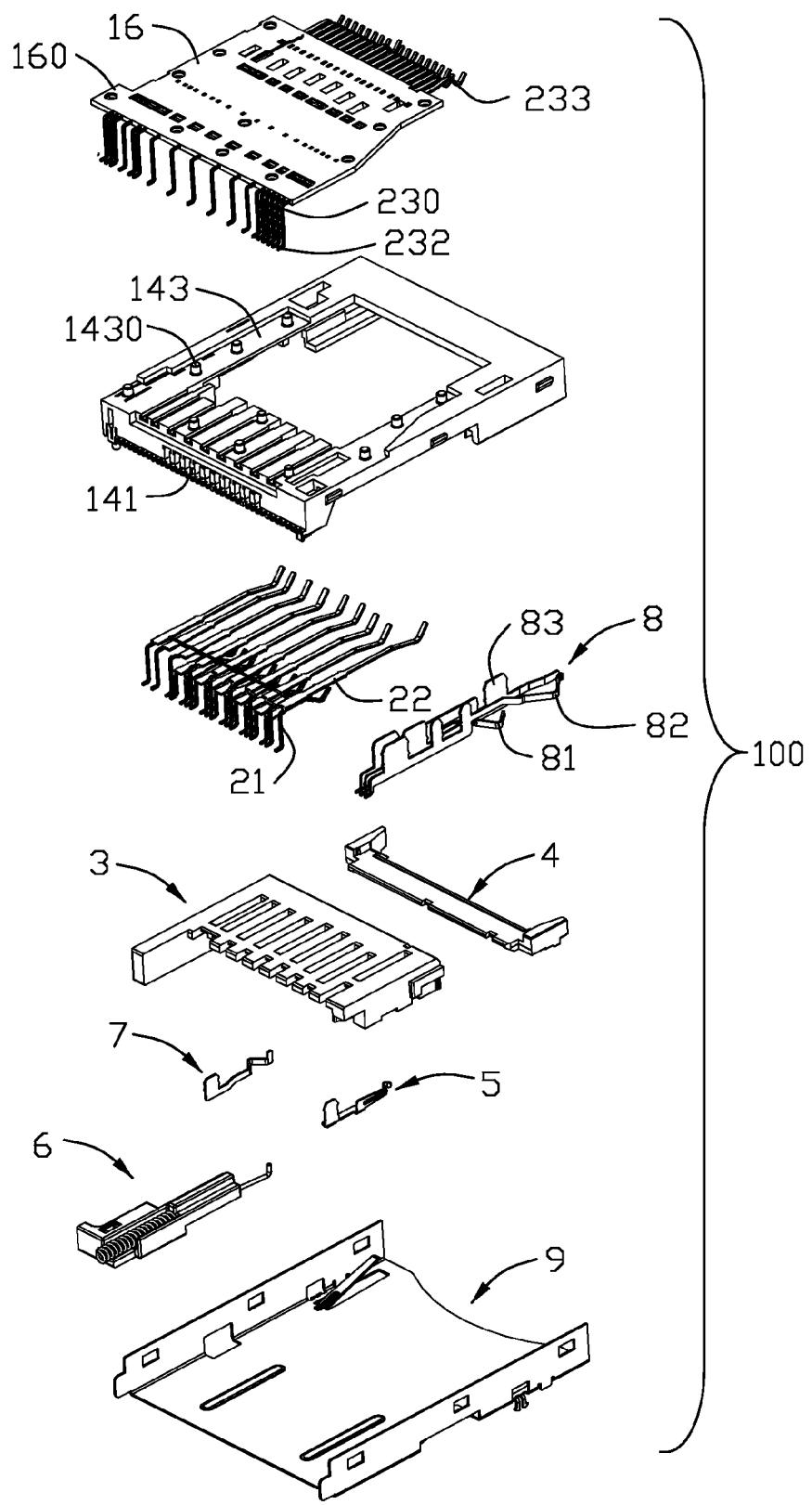
FIG. 4 is another exploded view of the electrical card connector.
Figure 5:
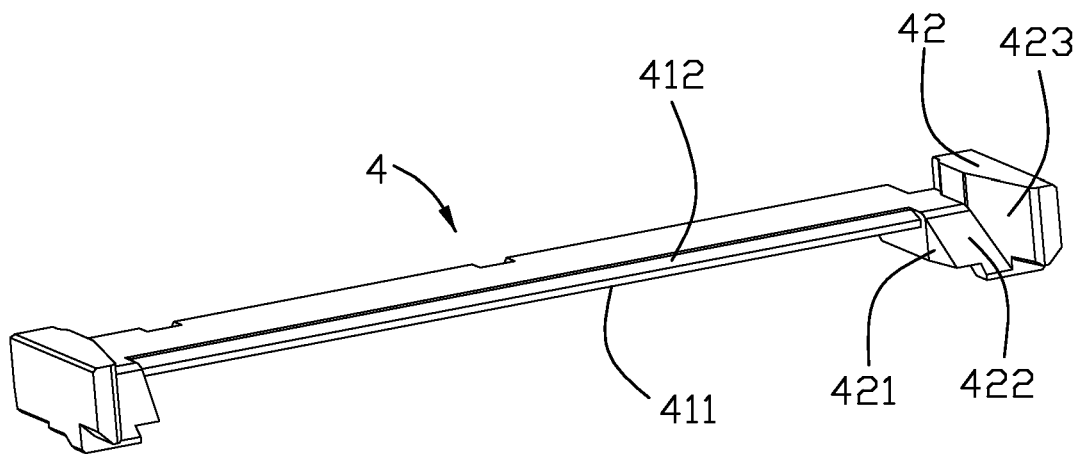
FIG. 5 is a perspective view of a lifting plate of the electrical card connector.
Figure 6:
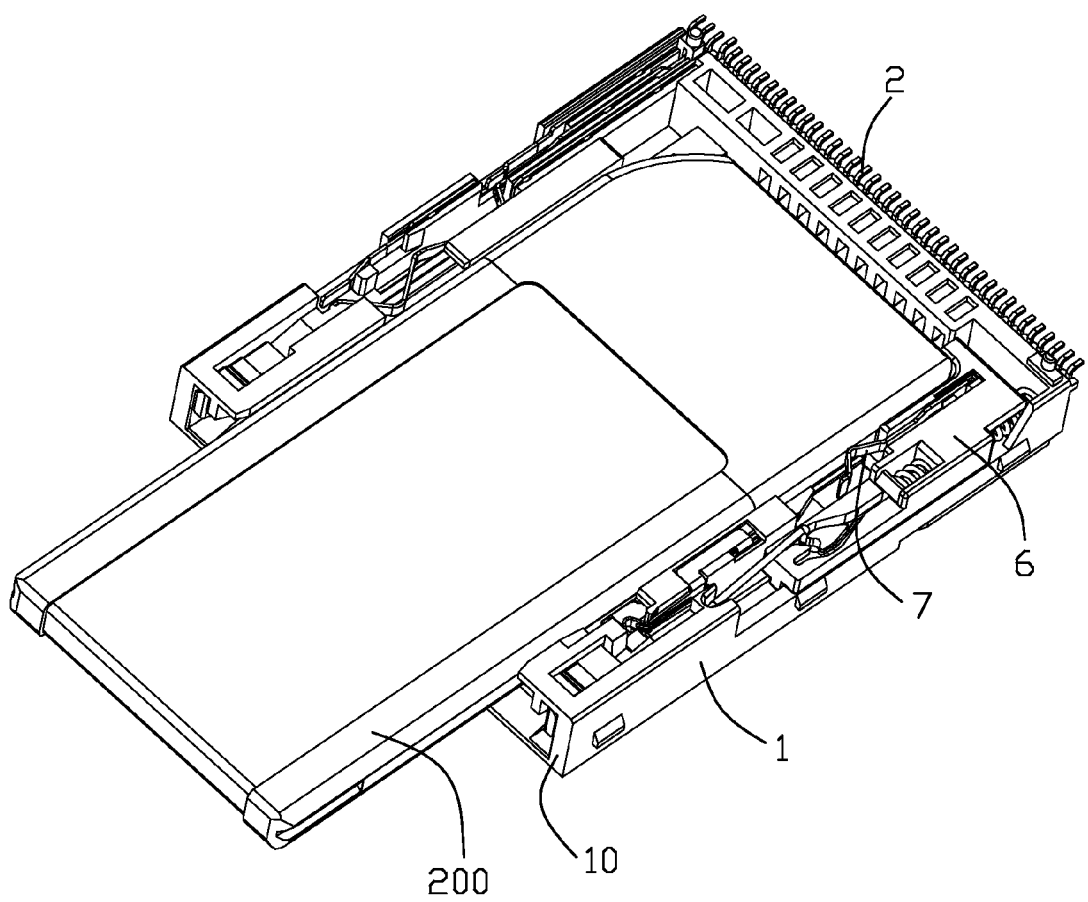
FIG. 6 is a partly perspective view of the electrical card connector after full insertion of a first card.
Figure 7:
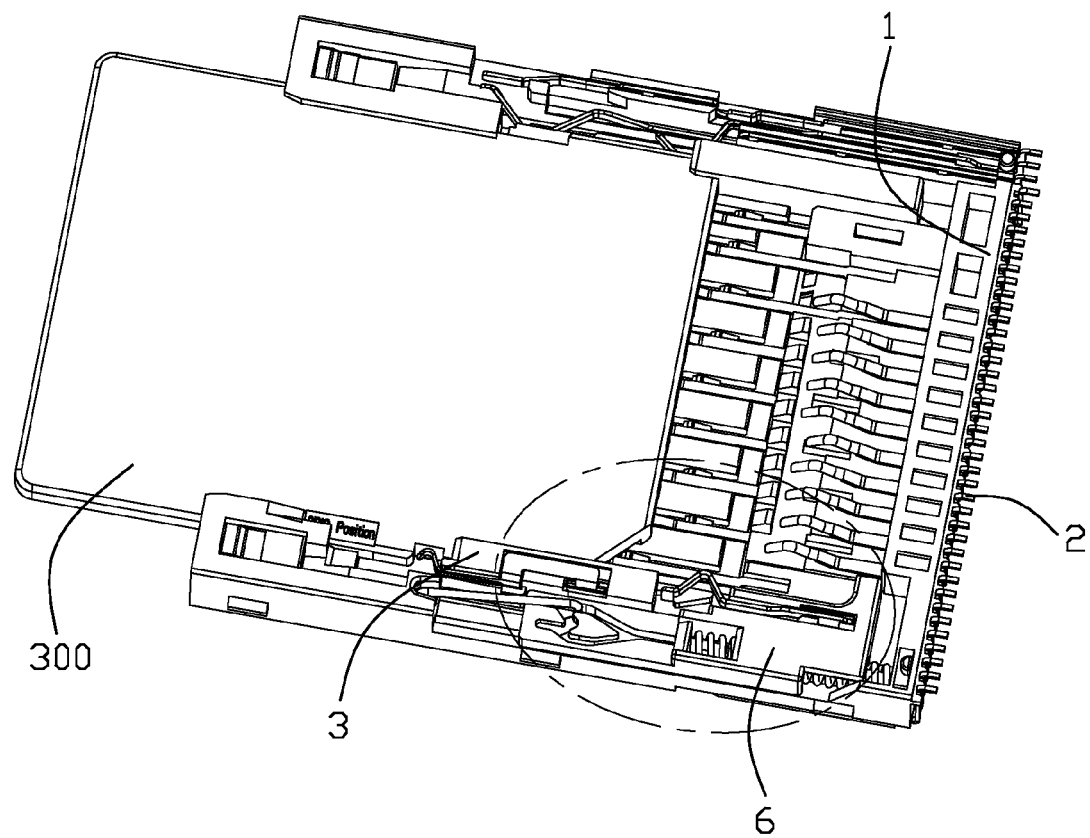
FIG. 7 is a partly perspective view of the electrical card connector after full insertion of a second card.
Figure 8:
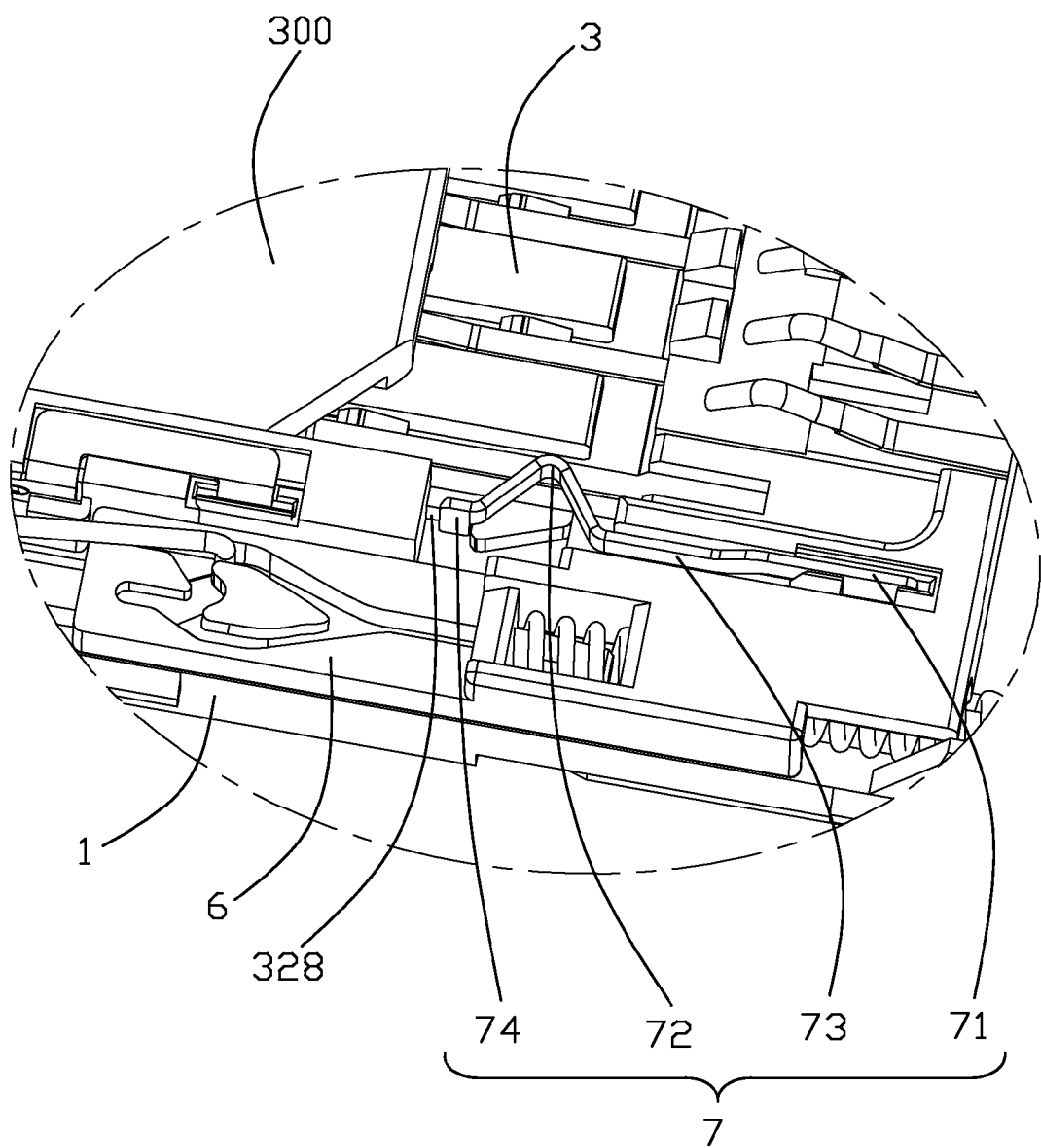
FIG. 8 is a partly enlarged view taken from the circle shown in FIG. 7.
Figure 9:
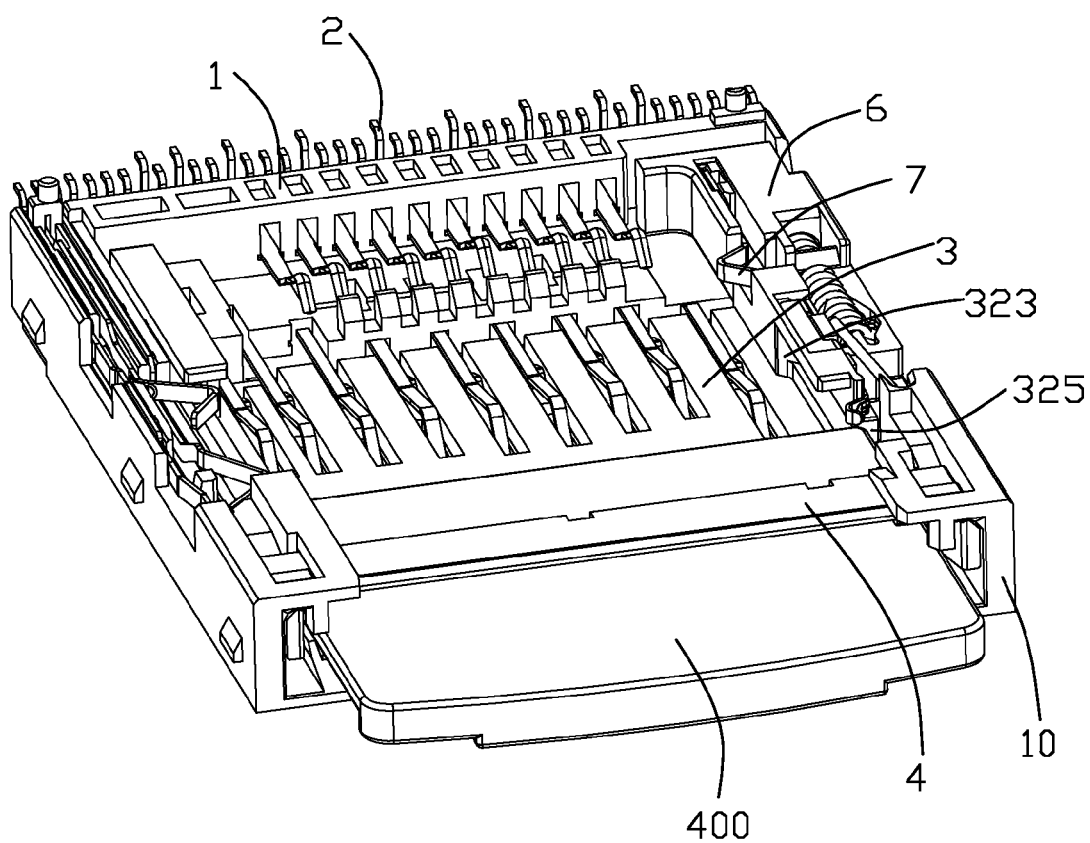
FIG. 9 is a partly perspective view of the electrical card connector after full insertion of a third card.

Referring to FIGS. 1-9, an electrical card connector 100 for being mounted on a PCB (not shown) can be used for insertion of many kinds of cards such as MS card 200, SD card 300, and XD card 400, as best shown in FIGS. 6, 7 and 9. It is a common knowledge that the MS card 200 is thicker and longer than the SD card 300 and the XD card 400, the SD card 300 is thicker and longer than the XD card 400. In order to simplify description hereinafter, the MS card 200 is also named the first card 200, and the SD card 300 is named the second card 300, the XD card 400 is named the third card 400. The electrical card connector 100 includes an insulative housing 1, a plurality of terminals 2 retained in the insulative housing 1, a slide carrier 3 sliding in the insulatice housing 1, a lifting plate 4 mounted on a front of the insulative housing 1, a spring 5 mounted on the slide carrier 3, a push-push eject mechanism 6, a locking body 7 fixed on the eject mechanism 6, a switch terminal group 8 fixed on the insulative housing 1, and a metal shell 9 covering the insulative housing 1. The terminals 2 are divided into a first terminal group 21 for mating with the first card 200, a second terminal group 22 for mating the second card 300, and a third terminal group 23 for mating the third card 400 arranged along a card insertion direction.

The insulative housing 1 defines a front mating face 10 and a insertion slot 12 extending rearwardly from the mating face 10. The insertion slot 12 includes a first insertion slot 121 and a second insertion slot 122 which overlap partly with each other in an vertical direction of the insulative housing 1. An overlap part is formed between the first insertion slot 121 and the second insertion slot 122. The first insertion slot 121 is defined for receiving the first card 200 and the second card 300. The second insertion slot 122 is defined for receiving the third card 400. The insulative housing 1 includes a base portion 11, a pair of side walls 13 extending forwardly from lateral sides of the base portion 11, and a bottom wall 14 connecting the base portion 11 and the side walls 14. The insertion slot 12 is formed between the base portion 11, the side walls 13 and the bottom wall 14. The side walls 13 each defines a receiving cavity 15 recessed from the mating face 10 respectively for receiving the lifting plate 4. The bottom wall 14 defines a pair of slide slots 142 behind the receiving cavity 15 and extending into the side walls 13 respectively.

One side wall 13 of the insulative housing 1 defines a receiving chamber 132 disposed at an outer side of the slide slot 142. The other side wall 13 defines a plurality of locating slots 141 to fix the switch group 8. The bottom wall 14 defines a plurality of passages 141 extending rearwardly through the base portion 11, and a position space 143 fixing an insulator plate 16 which insert molding around the third terminal group 23. The position space 143 is recessed from a bottom surface of the bottom wall 14. The position space 143 defines a plurality of protrusion posts 1430 corresponding to through holes 160 formed on the insulator plate 16.

Each terminals 2 includes a retaining portion 210, 220, 230, a flexible portion 211, 221, 231 extending from an end of the retaining portion 210, 220, 230, a tail portion 212, 222, 232 extending from another end of the retaining portion 210, 220, 230 out of the insulative housing 1 for being mounted on the PCB, and a contact portion 213, 223, 233 cantileveredly extending from the retaining portion 210, 220, 230 into the insertion slot 12. The retaining portions 210, 220 of the first terminal group 21 and the second terminal group 22 are retained in the passages 141 of the insulative housing 1. The retaining portions 230 of the third terminal group 23 is insert molded in the insulator plate 16. The contact portions 233 of the third terminal group 23 are positioned at front of other contact portions 213, 223.

The slide carrier 3 includes a flat bottom plate 31 defining a plurality of through grooves 311 corresponding to the contact portions 223 of the second terminal group 22, and a pair of slide portions 32 disposed opposite lateral of the bottom plate 31. The bottom plate 31 defines a plurality of support portions 313 each connecting opposite inner walls of two adjacent grooves 311 respectively. The support portions 313 are disposed in the grooves 311 and under a top surface of the bottom plate 31 respectively. The slide portion 32 defines a depression 322 at an inner side wall thereof for receiving a side of the second card 300. The slide portion 32 includes a first push portion 323, and a second push portion 325 located at a front end thereof. The first push portion 323 is disposed behind the second push portion 325 and adjacent to the depression 322. A top portion of the slide portion 32 defines a fixing slot 326 to fix the spring 5. A rear outer side of the slide portion 32 defines a locking slot 328 facing to an outer side of the slide carrier 3, and an inclined surface 329 adjacent behind the locking slot 328.

The lifting plate 4 includes an elongated cross beam 41 disposed in the overlap part of the first insertion slot 121 and the second insertion slot 122, and a pair of guiding blocks 42 formed opposite sides of the cross beam 41 for guiding and restricting the electrical cards 200, 300, 400 inserted into the first insertion slot 121 or the second insertion slot 122. The guiding blocks 42 are received in the receiving cavity 15 to be prevented from out of the insulative housing 1. The first insertion slot 121 is disposed above the cross beam 41. The second insertion slot 122 is disposed under the cross beam 41. A front end of the cross beam 41 defines a first inclined surface 411, and a second inclined surface 412 above the first inclined surface 411 which both extend toward the mating surface 10 of the insulative housing 1. The first inclined surface 411 and the second inclined surface 412 are made of a blade-shape. The guiding block 42 defines a first guiding surface 421, a second guiding surface 422, and a third guiding surface 423 which all extending inclined far from the mating face 10 into the insertion slot 12. Both of the first guiding surface 421 and the third guiding surface 423 are perpendicular to a level surface. The third guiding surface 423 is offset outwardly relative to the first guiding surface 411. The second guiding surface 422 extends upwardly and obliquely along the card insertion direction.

The eject mechanism 6 includes a slider 61 movable in the receiving chamber 132 abutting against the slide carrier 3 toward the mating face 10, a coiled spring 62 abutting against the slider 61, and a link rod 63 for controlling positions of the slider 61 with respect to the insulative housing 1. The slider 61 defines a heart-shaped cam recessed from a top surface thereof, a protrusion 611 protruding into the insertion slot 12 from a rear end thereof, a retaining slot 612 to fix the locking body 7, and a receiving slot 613 extending forwardly from the retaining slot 612 through out thereof.

The locking body 7 is a metal spring, and includes a locating portion 71 retained in the retaining slot 612 of the slider 61, an engaging portion 72 protruding into the insertion slot 12 for locking the first card 200, a flexible portion 73 extending from the locating portion 71 to the engaging portion 72, and a chip locking portion 74 protruding downwardly from a distal end of the engaging portion 72, The locking portion 72 locks into the locking slot 328 of the slide carrier 3 before insertion of the cards 200, 300, 400.

The switch terminal group 8 includes a first switch terminal 81, a second switch terminal 82, and a third switch terminal 83 disposed in an inner side of the first switch terminal 81 and the second switch terminal 82. The first switch terminal 81 and the second switch terminal 82 contacts the third switch terminal 82 respectively while the cards 200, 300, 400 inserted into the insertion slot 12 fully. The switch terminal group 8 is widely used in electrical card connector, so detailed description is omitted hereinafter.

The metal shell 9 is stamped from a metal sheet and includes a top wall 91 and a pair of bending walls 92 extending downwardly from lateral sides of the top wall 91. The top wall 91 forms a spring tab 910 abutting against the guiding block 42 of the lifting plate 4 in the vertical direction of the insulative housing 1.

Referring to FIG. 6, while the first card 200 is being inserted into the electrical card connector 100, the first card 200 would be restricted in a left-right direction by the first guiding surface 421 and guided by the first inclined surface 411 in the vertical direction of the insulative housing 1 to make the first card 200 be upwardly and rearwardly inserted into the first insertion slot 121. At the same time, the lifting plate 4 moves downwardly, the spring 5 abuts against a side of the first card 200. The first card 200 abuts against the engaging portion 72 of the locking body 7 to make the locking portion 74 escape from the locking slot 328 of the slide carrier 3. The slide carrier 3 is unmovable while the first card 200 being continued to be inserted. The first card 200 moves rearwardly and pass over the slide carrier 3 to directly push protrusion 611 of the eject mechanism 6. Finally, the contact portions 213 of the first terminal group electricity contact the first card 200.

While the first card 200 is being ejected, the protrusion 611 of the eject mechanism 6 abuts against a front end of the first card 200 to push the first card 200 to move toward the mating face 10 and out of the electrical card connector 100. The flexible portion 73 drives the locking portion 74 along the inclined surface 329 to insert into the locking slot 328 again. Therefore, the slide carrier 3 is unmovable while the first card 200 being inserted or withdrawn always. Thus, the contact portions 223 of the second terminal group 22 could not protrude upwardly to touch the first card 200, the second terminal group 22 is protected.

Referring to FIG. 6, while the second card 300 is being inserted into electrical card connector 100, the second card 300 would be restricted in a left-right direction by the first guiding surface 421 and guided by the first inclined surface 411 to make the second card 300 be inserted into the first insertion slot 121. At the same time, the lifting plate 4 moves downwardly, a side of the second card 200 is receiving in the depression 322 of the slide carrier 3. A front end of second card 300 abuts against the first push portion 323 to push the slide carrier 3 further to push eject mechanism 6 slide together in the insultive housing 1. The support portions 313 push the contact portions 223 of the second group 22 to be raised upwardly gradually to electricity contact the second card 300.

Since the slide carrier 3 and the slider 61 of the eject mechanism 6 are locked with each other, and the slider 61 is restricted by the coiled spring 62 and the link rod 63. The second card 300 would not be pulled toward the mating face 10 by the slide carrier 3 While an electrical equipment which installing the electrical card connector 100 is hit or shock by other objects. It ensures reliability electrical connect between the second card 300 and the electrical connector 100. While the second card 300 is being ejected, the first push portion 323 of the slide carrier 3 push the front end of the second card 300 to push the first card 200 to move toward the mating face 10 and out of the electrical card connector 100. The coiled spring 62 abuts against the slider 61 to move with the slide carrier 3 together. Finally, The contact portions 223 of the second terminal group 22 moves downwardly to be received in the grooves 311 again, and lose contact with the second card 300.

Referring to FIG. 9, while the third card 400 is being inserted into electrical card connector 100, the third card 400 would be restricted in a left-right direction by the third guiding surface 423, and guided by both of the first inclined surface 411 and the second guiding surface 422 in the vertical direction of the insulative housing 1 to make the third card 300 be inserted into the second insertion slot 122 because the third card 400 is much wider. A front end of the third card 400 pushes the second push portion 325 to make the slide carrier 3 move rearwardly with the eject mechanism 4 together. The contact portions 233 of the third terminal group 23 electrically connect the third card 400.

The locking body 7 locks the slide carrier 3 with the eject mechanism together. The third card 400 would not be pulled toward the mating face 10 by the slide carrier 3 while an electrical equipment which installing the electrical card connector 100 is hit or shock by other objects. Reliability electrical connection between the third card 400 and the electrical connector 100 is ensured. While the third card 300 is being ejected, the second push portion 325 of the slide carrier 3 push the front end of the third card 400 to push the third card 400 out of the electrical connector 100. The coiled spring 62 abuts against the slider 61 to move forwardly with the slide carrier 3 together.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

We claim:

1. An electrical card connector, comprising:
an insulative housing defining a front mating face, and an insertion slot extending rearwardly from the mating face for receiving a first card and a second card shorter than the first card;

a plurality of terminals retained in the insulative housing, the terminals each having a contact portion extending into the insertion slot, and a tail portion extending out of the insulative housing for being mounted on a print circuit board;

a slide carrier slidable in the insulative housing, the slide carrier defining a push portion to eject the second card;

an eject mechanism mounted in the insulative housing for pushing the slide carrier toward the mating face, and defining a protrusion on a rear end thereof to eject the first card; and a locking body attached to a slider of said ejecting mechanism to lock the slider carrier with the slider;

wherein the locking body defines an engaging portion protruding into the insertion slot, the engaging portion is deflectable to release locking engagement between the slider and the slide carrier while the first card being inserted into the insertion slot.

2. The electrical card connector as claimed in claim 1, wherein said slider pushing the slide carrier in a card insertion or withdraw direction, a coiled spring having one end abutting against the slider and the other end abutting against the insulative housing, and a link rod having one end portion retained in the insulative housing and the other end portion movable in a heart-shaped cam formed in the slider, the engaging portion is located between the protrusion and the push portion, the protrusion is disposed at rear and inner side of the push portion.

3. The electrical card connector as claimed in claim 1, wherein the locking body is a metal spring, and includes a retaining portion retained on the slider, a flexible portion extending from the retaining portion to the engaging portion, and a locking portion formed on a distal end of the engaging portion, the slide carrier defines a locking slot locking with the locking portion, and an inclined surface for guiding the locking portion sliding into the locking slot.

4. The electrical card connector as claimed in claim 3, wherein the slider defines a receiving slot to receive the flexible portion of the locking body for ensuring the flexible portion deformed between opposite side inner walls of the receiving slot.

5. The electrical card connector as claimed in claim 1, wherein the terminals includes a first terminal group for engaging with the first card and a second terminal group for engaging the second card, both of the contact portions of the first terminal group and the protrusion disposed further from the mating face than the push portion, the first card abuts against the engaging portion to force the locking portion to escape from the slide carrier, thus the slider moves relative to the slide carrier while the first card inserting into the insertion slot.

6. The electrical card connector as claimed in claim 5, wherein the slide carrier includes a bottom plate and a pair of slide portions disposed opposed sides of the bottom plate respectively, one of the slide portion defines a depression extending forwardly through therein for receiving a side of the second card, a slider slot is formed on a side of the insulative housing for receiving and guiding the slide portion to slide, the push portion is formed on the slide portion, and located behind the depression, the insertion slot is defined between the bottom plate and the slide portions.

7. The electrical card connector as claimed in claim 6, wherein each terminals of the second terminal group defines a retaining portion retained in the inslusative housing, and a flexible portion extending from the retaining portion to the contact portion, the bottom plate defines a plurality of grooves for receiving the contact portions and a plurality of support portions connected opposite inner side walls of the grooves, the support portions push the flexible portions to raise while the slide carrier movable, the flexible portion drives the contact portions to be raised upwardly out of the grooves to contact with the second card.

8. The electrical card connector as claimed in claim 1, wherein the insertion slot includes a first insertion slot and a second insertion slot which overlap partly with each other in an vertical direction of the insulative housing, an overlap part is formed between the first insertion slot and the second insertion slot, the electrical card connector includes a lifting plate attached to the insulative and movable up and down within a section relative to the insulative housing, the lifting plate includes an elongated cross beam disposed in the overlap part, and a pair of guiding blocks formed opposite sides of the cross beam for guiding and restricting at least two electrical cards with different width.

9. The electrical card connector as claimed in claim 8, wherein the electrical card connector further includes a metal shell covering the insulative housing, the shell forms a spring tab abutting against the lifting body in the vertical direction of the insulative housing.

10. The electrical card connector as claimed in claim 8, wherein the push portion includes a first push portion and a second push portion which for abutting against a front end of at least two electrical cards with different length respectively.

11. An electrical card connector, comprising:

an insulative housing defining a front mating face, and an insertion slot extending rearwardly from the mating face for receiving a first card and a second card shorter than the first card;

a plurality of terminals retained in the insulative housing, the terminals each having a contact portion extending into the insertion slot for contacting the first card or the second card, and a tail portion extending out of the insulative housing for being mounted on a print circuit board;

a push-push eject mechanism mounted in the insulative housing, and including a slider slidable in a card insertion direction, a coiled spring abutting against the slider, and a link rod to control positions of the slider with respect to the insulative housing, the slider includes a front slider and a rear slider which abutting against each other in a card insertion direction, the rear slider defining a protrusion into the insertion slot to eject the first card, the front slider defining a push portion located at front and outside of the protrusion; and a locking body unlocking the front slider with the rear slider together while the first card is inserted into the insertion slot;

wherein the locking body locks the front slider with the rear slider together while the second card is inserted into the insertion slot.

12. The electrical card connector as claimed in claim 11, wherein the locking body defining an engaging portion protruding into the insertion slot, the engaging portion is located between the protrusion and the push portion in the card insertion direction, the engaging portion is deflectable to force the locking body to release locking engagement between the front slider and the rear slider while the first card is inserted into the insertion slot.

13. The electrical card connector as claimed in claim 11, wherein the locking body is a metal spring, and includes a retaining portion retained in the rear slider, a flexible portion extending from the retaining portion to the engaging portion, and a locking portion protruding downwardly from a distal end of the engaging portion, the front slider defines a locking slot for locking the locking portion, and an inclined surface for guiding the locking portion sliding into the locking slot.

14. The electrical card connector as claimed in claim 13, wherein the electrical card connector includes a metal shell covering on the insulative housing, the shell defines a spring tab abutting against the lifting pate in the upper-to-lower direction of the insulative housing.

15. The electrical card connector as claimed in claim 11, wherein each terminals defines a retaining portion retained in the inslulative housing, and a flexible portion extending from the retaining portion to the contact portion, the front slider defines a plurality of grooves for receiving the contact portions and a plurality of support portions connected opposite inner side walls of the grooves, the support portions push the flexible portions to raise while the slide slider movable, the flexible portion drives the contact portions to be raised out of the grooves to contact the second card.

16. The electrical card connector as claimed in claim 11, wherein the electrical card connector includes a lifting plate mounting in the insulative housing and moveable in an upper-to-lower direction thereof, the insertion slot includes a first insertion slot and a second insertion slot which overlap partly with each other in an vertical direction of the insulative housing, an overlap part is formed between the insertion slot and the second insertion slot, the lifting plate includes an elongated cross beam disposed in the overlap part, and a pair of guiding blocks formed opposite sides of the cross beam for guiding and restricting insertion of at least two electrical cards with different width.

17. An electrical card connector comprising:
an insulative housing defining a card receiving slot for receiving different first and second type cards;
a plurality of front terminals positioned on a front portion of the housing having front contact sections thereof;
a plurality of rear terminals positioned on a rear portion of the housing having rear contact sections thereof;
a slider carrier movable along a front-to-back direction with regard to the housing around the front portion of the housing, said slider carrier defining a first abutment section for the first type card to abut against;
an eject mechanism including a slider moveable along said front-to-back direction with regard to the housing around the rear portion of the housing, said slider cooperating with a spring for being reciprocally held in front and rear positions, said slider defining a second abutment section for the second type card to abut against; and
a moveable locking device attached to one of the slider carrier and said slider and selectively locked to the other; wherein
in a first situation when the first abutment section is abutted against by the first type card, said locking device locks said slider carrier and said slider together so as to have said slider carrier and said slider move together constantly under condition that both said slider and said slider carrier endure a spring force from the spring; in a second situation when the second abutment section is abutted against by the second type card, said locking device unlocks the slider carrier from the slider so as to have said slider move alone while leaving said slider carrier still under condition that only the slider endures the spring force while said slider carrier not.

18. The electrical card connector as claimed in claim 17, wherein under the second situation, said slider carrier is retained in an original position without moving rearward by a retention force.

19. The electrical card connector as claimed in claim 18, wherein said retention force is derived from the front terminals.

20. The electrical card connector as claimed in claim 17, wherein said moveable locking device constantly locks said slider and said slider carrier together when no card is inserted into the receiving slot while being actuated by the second type card in the second situation to unlock said slider carrier from the slider.

\* \* \* \* \*